Patented Oct. 2, 1934

1,975,256

UNITED STATES PATENT OFFICE 1,975,256

HALOGENATED PYRANTHRONE AND PROCESS OF MAKING SAME

Joseph Deinet, Milwaukee, Wis., assignor to E. I. du Pont de Nemours & Company, Wilmington, Del., a corporation of Delaware No Drawing. Application October 15, 1932, Serial No. 637,985

50 Claims. (Cl. 260—61)

This invention relates to novel organic compounds of the pyranthrone series and to a process of making the same. More particularly, this invention deals with novel halogen derivatives of pyranthrone, which are distinguished from known halogen-pyranthrones by the property of yielding upon condensation with alpha-aminoanthraquinones vat dyestuffs of different color shade than those obtainable similarly from known halogenated pyranthrones.

By "pyranthrone" in this specification, I am referring to the well-known condensation product obtainable by heating in alkaline solution 2,2′-dimethyl-1,1-dianthraquinonyl. This compound is itself a vat dyestuff, and is generally assumed to possess a structure as represented by the following formula:

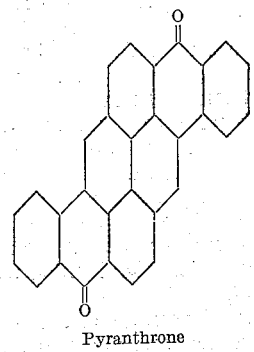

Pyranthrone

It has been known that this compound may be halogenated to produce various derivatives containing from 1 to 4 or even 8 atoms of halogen per molecule. It has also been known to react these various halogen derivatives with amino anthraquinone bodies to produce various mono- or poly - anthraquinonyl - amino-pyranthrone compounds. The halogenation has heretofore been carried out in various media, such as nitrobenzene, sulfuric acid, oleum, chlorosulfonic acid, or even simply aqueous suspension. When these halogen compounds are condensed with alpha-amino-anthraquinone, vat dyestuffs are obtained which dye cotton in shades ranging from brown to violet-black.

I have now found that if pyranthrone is reacted upon with halogenating agents in the presence of certain catalyzers, as more fully set forth in copending application of myself and David Katz, Ser. No. 637,986, filed of even date herewith, novel halogen addition-compounds of pyranthrone are produced which may then be treated with oxidizing or different halogenating agents, as more particularly defined hereinafter, to produce novel halogen derivatives of pyranthrone. These novel halogen derivatives are apparently isomeric with hitherto known halogen-pyranthrone derivatives. In dry form they are orange to scarlet powders of brighter and redder colors than the corresponding known halogen-pyranthrones. Their most important distinguishing characteristic, however, resides in their property of yielding upon condensation with alpha-aminoanthraquinone, vat dyestuffs which dye cotton in khaki to green shades. The condensation products obtained from mono-halogen-pyranthrone obtainable according to this invention and alpha-amino-anthraquinone give khaki dyeings. Those from the dihalogen and trihalogen-pyranthrones give olive-green dyeings. These novel vat dyestuffs possess exceedingly valuable fastness properties and tinctorial strength, and excell in these respects over other olive-green vat dyestuffs now on the market.

It is accordingly an object of my invention to provide a process for producing novel halogen-pyranthrone bodies.

It is a further object of my invention to provide a process for halogenating pyranthrone whereby the reaction may be controlled so as to produce first a halogen addition-compound with pyranthrone, which may then be converted into novel halogenated pyranthrones.

It is a further object of my invention to produce novel brominated or chlorinated pyranthrone compounds which are characterized by the property of forming vat dyestuffs of greenish shades when condensed with alpha-amino-anthraquinone.

Other and further important objects of my invention will appear as the description proceeds.

As already indicated, I accomplish my novel objects by halogenating pyranthrone under conditions leading first to an intermediate additioncompound of pyranthrone and halogen. To accomplish this, I effect the halogenation in the presence of an arylamine, phenol or other body capable of forming a highly halogenated compound. The presence of this body seems to have a special catalytic or orienting effect upon the entering halogen atoms. Many arylamines, phenols and analogous compounds may be used for this purpose. The limitations upon these are more fully discussed in copending application Ser. No. 637,986. Aniline, o-, m-, and p-toluidine, and alpha-naphthylamine or salts of these are examples of highly suitable arylamines. Also phenols, such as phenol, cresol, alphanaphthol or hexalin, or other readily halogenable organic compounds, such as solvent naphtha or acetone may be used with great success. Finally, inorganic reducing agents such as sulfur dioxide effect the same results. It seems that the formation of the addition product is conditioned upon the presence of a small quantity of a mild reducing agent, such as HBr or $SO_2$ in the initial stages of the reaction. The substances mentioned supply a small quantity of such reducing agent by reacting with the halogenating agent used, such as $Br_2$ or $SO_2Cl_2$.

As solvent or suspending medium, any anhydrous organic liquid may be employed; for instance, nitrobenzene, dichlorobenzene, trichlorobenzene, tetrachlorethane. Since, however, aniline is closely related to nitrobenzene and may even accompany the latter in small quantities as an impurity, it is particularly advantageous to use nitrobenzene as the suspending medium, and aniline or aniline-hydrochloride as the catalyst. In fact, I have found that if "recovered" nitrobenzene is used, the quantity of aniline present in this grade of nitrobenzene as an impurity is sufficient to exert its catalytic or orienting influence on the reaction, and the further addition of aniline hydrochloride may be dispensed with. From the latter fact it will be obvious that the quantity of arylamine (or phenol, etc.) required for the purpose of this invention is not very great, although of course greater quantities produce no harm. Other halogenation catalysts, such as iodine, may be added, and are indeed desirable in that they speed up the reaction.

In the second step of my process, the novel halogen addition-compound is subjected to the action of an anhydrous oxidizing agent, such as a strong halogenating agent, at elevated temperatures. The halogenating agent used for this second step should preferably be more powerful than that used for forming the addition-compound. Thus, where bromine, sulfur monobromide or hydrobromic acid is used for the first step, thionyl chloride, sulfuryl chloride or chlorine form satisfactory halogenating agents for the second step. Moreover, the halogen content of the final product in this case is greater where sulfuryl chloride or chlorine is used for the second step than where the weaker agent, thionyl chloride, is used. In the case where sulfuryl chloride is used as the first halogenating agent, either chlorine or bromine may be used for the second step. But here again, better results are obtained by the use of bromine in the first step and sulfuryl chloride in the second step than by the reverse procedure. Sulfuryl chloride is evidently a more powerful halogenating or oxidizing agent than bromine.

In certain cases, the two halogenating agents may be added to the pyranthrone together at the very beginning of the process. This is true for instance in the case of bromine and thionyl chloride. The different temperatures employed in the two stages of the reaction seem to determine the course of the reaction in each of the two steps of the process. This procedure, however, is inferior to the regular two-step procedure, wherein the second halogenating agent is not added until after the complete formation of the intermediate addition-compound.

As indicated above, elevated temperature is an essential factor in the second stage of the reaction. Although some conversion of the intermediate addition compound into the final halogenated pyranthrone may be effected at ordinary temperatures, provided the strong halogenating agent is allowed to contact with the addition compound a very long time, the rate of conversion is very slow. At 55–60° C., however, the conversion proceeds at a noticeable rate. The optimum temperature varies with the particular halogenating agent employed for the second step. In the case of chlorine it is about 75–80° C. or higher. In the case of sulfuryl chloride it is about 110–120° C. In any case it appears advantageous to use the higher temperatures, since they do no harm, but speed up the reaction. The natural limit is clearly the boiling point of the solvent employed.

The nature of the final halogen in the pyranthrone appears to be predominately determined by the halogenating agent used in the first step. Thus where bromine and thionyl chloride are used, the product is substantially a monobromo compound, of very little chlorine content. Where bromine and sulfuryl chloride are used, the final product contains 23% bromine and but 4.7% chlorine where the bromine is used in the first step, but only 17.7% bromine and 6.1% chlorine where the sulfuryl chloride is employed first. Evidently, the function of the strong halogenating agent used in the second step is more that of an oxidizing agent than of a halogenating agent. In other words, it oxidizes the hydrochloric or hydrobromic acid liberated when halogenation in the nucleus takes place, and thereby encourages the decomposition of the addition product with the formation of nuclearly halogenated pyranthrone. For this reason, and for the purpose of better distinguishing the second halogenating agents from the first, I shall refer to them hereinafter as oxidizing agents, or more particularly, as anhydrous oxidizing agents. The limitation "anhydrous" is necessary for the reason that the intermediate addition-compound is unstable in the presence of moisture, as more particularly discussed below.

It is of further interest in this connection, that when chlorine is used in the first step it does not give the intermediate addition-compound to any appreciable extent. In the light of my theory above set forth, this is to be explained by the fact that when chlorine reacts with aniline, the by-product is hydrochloric acid which has practically no reducing powers.

An incidental advantage of my novel process is that over-halogenation practically never occurs. Even if an excess of bromine is used in the first step, and in spite of the great quantity of chlorinating agent in the second step, the final products obtained are generally uniform, depending on the particular chlorinating agent selected. If thionyl chloride is used, the result is a monobromo compound. If chlorine or sulfuryl chloride is used, the product is substantially a dibromo compound, mixed apparently with some monochloro-monobromo compound. This effect is particularly advantageous, because it assures the production of uniform products, which in turn lead eventually to a uniformly constituted dyestuff of high purity and brilliance.

An analogous advantage occurs in the case of chlorination, although here the limits are higher. Thus, by using sulfuryl chloride for forming the addition-product and chlorine gas as the oxidizing agent, a trichloro-pyranthrone is obtained.

It follows from the above facts that the quantity of halogenating agent used either in the first stage or in the second stage may vary within wide limits. Excessive quantities do not harm the reaction. Of course, economical considerations would prohibit using wasteful excesses. For practical purposes, therefore, it is well to limit the quantity of halogenating agent to between two and five moles per mole of pyranthrone, in either stage.

As already indicated, the nature of the halogen in the final product seems to be determined mostly by the particular halogenating agent used in the first step, while its quantity is more dependent on the oxidizing agent used in the second stage. All cases, however, have the one feature in common, that the entering halogen or at any rate part of it, apparently takes a certain definite position in the pyranthrone molecule. This is evidenced by the fact that the final product when condensed with alpha-amino-anthraquinone gives a dyestuff dyeing cotton in shades different from those obtainable from analogous condensations employing hitherto known halogen pyranthrones of the same halogen content. Thus, the monohalogen product obtained according to this invention, by the use of bromine as halogenating agent and thionyl chloride as oxidizing agent, when condensed with alpha-amino-anthraquinone, gives a khaki vat dyestuff. The dihalogen compound obtained from bromine and sulfuryl chloride and the trichloro compound from sulfuryl chloride and chlorine give olive-green vat dyestuffs. Moreover, although the dihalogen-pyranthrone obtained by the successive use of bromine and sulfuryl chloride contains both bromine and chlorine, indicating that it is probably a mixture of dibromo-pyranthrone and monobromo-monochloro-pyranthrone, the olive-green vat dyestuff obtained therefrom by condensation with alpha-amino-anthraquinone yields bright and uniform dyeings, suggesting uniformity of composition. This clearly must be explained by the fact that the entering halogen, regardless whether chlorine or bromine, goes into the same position in the pyranthrone nucleus.

The formation of my novel intermediate addition product above described can be recognized readily by its precipitation out of the nitrobenzene solution or suspension, in the form of a black precipitate. When viewed under the microscope, it presents the form of dark violet needles with green fluorescence. In its own reaction mass and at ordinary temperature, it is fairly stable, and may be kept for days. It seems that this intermediate is in equilibrium with the small amount of hydrobromic acid or other reducing agent liberated by the halogenation of the catalyzer employed, provided it is kept out of moisture. Moisture, heat, or contact with air decomposes it rapidly into pyranthrone and halogen. Oxidizing agents, particularly halogenating agents, convert it into halogenated pyranthrone, as already described above.

The formation of this intermediate addition product seems to determine the positions of the halogen in the ultimate halogenation product obtained after treatment with oxidizing agents. As already stated, this fact very probably accounts for the novel and distinctive properties of my final halogenation products.

Without limiting my invention to any particular procedure, the following examples, in which parts by weight are given, will serve to illustrate my preferred mode of operation.

Example 1

40 parts of dry, amorphous pyranthrone are suspended in 600 parts of nitrobenzene containing 1 part of aniline hydrochloride. 35 parts of bromine are then added and the mass is stirred at 55–60° C. for about 18 hours. At this point the formation of the intermediate addition product is substantially complete. The originally orange mass turns black, and when a sample is viewed under a microscope it appears to consist of dark violet needles having a green fluorescence.

The mass is now cooled to 20° C.; 60 parts of sulfuryl chloride are added; and the mass is stirred at 20–22° C. for about 24 hours. The temperature is now raised to 65° C.; held at this value for 3 hours; raised further to 115–116° C., and maintained at this point for another 3 hours. During the latter stage the mass changes color again and becomes red. The mass is then cooled to room temperature and filtered; the filter-cake is washed successively with nitrobenzol and alcohol and dried.

The product thus obtained analyzes 23.2% Br and 3.6% Cl, and is very probably a mixture of dibromo-pyranthrone and monobromo-monochloro-pyranthrone. When dry it is a scarlet powder, soluble in concentrated sulfuric acid with a reddish-blue color, and in hot nitrobenzene with an orange color. It can be used directly as a vat dyestuff, and dyes cotton from a red-violet vat in bright orange to scarlet shades. When condensed with alpha-amino-anthraquinone it gives a vat dyestuff dyeing cotton from a violet vat in very strong and fast olive-green shades.

Example 2

40 parts of dry, amorphous pyranthrone are suspended in 600 parts of nitrobenzene, and 1 part of aniline hydrochloride plus 0.4 parts of iodine are added. 35 parts of bromine are then introduced; the mass is heated to 55–60° C., and stirred at this temperature for 18 hours. A black intermediate addition compound is formed, which appears to be substantially the same as in Example 1.

The remainder of the procedure is as in Example 1, and the isolated product exhibits the same properties as that in Example 1. It analyzes 23.0% Br and 4.7% Cl.

Example 3

The intermediate addition product is formed as in Example 1.

The mass is then cooled to 20° C., and a stream of chlorine gas is slowly fed in over a period of about 4 hours or as long as absorption of chlorine takes place. The mass is then stirred further for about 1 hour; heated to 75–80° C. and held at this value for about 3 hours. It is then cooled to room temperature, filtered, washed with nitrobenzene and alcohol, and dried.

The product is substantially identical with that obtained in Example 1. It analyzes 20.6% Br and 6.2% Cl.

Example 4

40 parts of dry, amorphous pyranthrone are suspended in 600 parts of nitrobenzene containing 1 part of aniline hydrochloride. A mixture of 35 parts of bromine and 30 parts of thionyl chloride is added and the mass is stirred at 20–22° C. for about 90 hours. The originally orange mass has by this time turned dark. To insure complete reaction, the temperature is raised to 80° C.; maintained at this value for 3 hours; further raised to 115° C., and kept at this point for another 3 hours. During the latter stage the mass brightens up again and turns orange-brown. The mass is now cooled, and the product filtered off, washed and dried.

The dry product is an orange-brown powder, dissolving in concentrated sulfuric acid with a reddish-blue color. It may be used directly as a vat dyestuff, and dyes cotton from a violet vat in orange shades. When condensed with alpha-amino-anthraquinone it gives a vat dyestuff dyeing cotton from a violet vat in khaki shades of good tinctorial strength and excellent fastness qualities.

The product of this example analyzes 12.5% Br and 1.8% Cl, and is very probably a novel monobromo-pyranthrone.

In this example the formation of the intermediate addition product and its oxidation by the thionyl chloride have been made to run to a certain extent concurrently. This condition, however, is not absolutely necessary, for it is possible to proceed first with the preparation of a distinct intermediate addition product as in Example 1, and then to react upon the mass with thionyl chloride to produce the novel monobromo-pyranthrone body.

Example 5

40 parts of pyranthrone are suspended in nitrobenzene containing aniline hydrochloride and iodine, and treated with bromine to form an intermediate addition product as in Example 2.

The mass is then cooled to 20° C.; 52 parts of thionyl chloride are added; and the mass is stirred at 20-22° C. for 48 hours. It is then heated to 70-75° C.; held at this temperature with stirring for 3 hours; further heated to 110-115° C. and stirred at this temperature for another 3 hours. During the latter stage the intermediate black mass changes color and turns orange-brown. The mass is then cooled to room temperature; the product is filtered off; washed first with nitrobenzene; and then with alcohol; and dried.

It resembles in properties those of the product of Example 4, and is substantially identical therewith. It analyzes 14.6% Br and 3.0% Cl.

Example 6

40 parts of dry, amorphous pyranthrone are suspended in 600 parts of nitrobenzene. 1 part of aniline hydrochloride and 0.4 parts of iodine are added. 60 parts of sulfuryl chloride are then introduced, and the mass is stirred at 22-23° C. for 24 hours. A black intermediate addition compound is formed, resembling in properties that of Example 1.

A stream of chlorine gas is now slowly fed into the mass over a period of 4 hours, or as long as absorption takes place. The mass is now heated slowly to 70-75° C.; stirred at this temperature for 2 hours; further raised to 110-115° C., and maintained at this value for another 2 hours. The change in color during the latter stage indicates complete reaction. It is then cooled, filtered, washed successively with nitrobenzene and alcohol, and dried.

The product thus obtained is an orange-brown powder, soluble in concentrated sulfuric acid with a reddish-blue color. When used as a dyestuff directly, it dyes cotton from a violet vat in orange-brown shades. When condensed with alpha-amino-anthraquinone, it gives a vat dyestuff dyeing cotton from a violet vat in olive-green shades of great tinctorial strength and excellent fastness qualities.

The product analyzes 19.25% Cl, which corresponds substantially to trichloro-pyranthrone.

Example 7

40 parts of dry, amorphous pyranthrone are suspended in 600 parts of nitrobenzene, and 1 part of aniline hydrochloride plus 0.4 parts of iodine are added. A stream of hydrobromic acid gas, as obtained by reacting with sulfuric acid upon sodium bromide, is now passed in, until 36 parts have been absorbed. The mass is stirred at room temperature for 20 hours. 60 parts of sulfuryl chloride are now added, and the mass is stirred further for 24 hours. It is now heated to 65-67° C., held at this temperature for 3 hours, raised to 110-115° C., and stirred at this temperature for further 3 hours. The mass is now cooled and recovered as in Example 1.

The product analyzes 19.8% Br and 1.5% Cl. In other properties it resembles the product of Example 1.

Example 8

40 parts of dry, amorphous pyranthrone are suspended in 600 parts of nitrobenzene, and 1 part of aniline hydrochloride plus 0.4 parts of iodine are added. 60 parts of sulfuryl chloride are now added, the mass is heated to 55-60° C., and stirred at this temperature for 18 hours. It is now cooled to room temperature, and 35 parts of bromine are introduced. The mass is stirred for 24 hours at room temperature, then heated at 65-67° C. for 3 hours, and again at 110-115° C. for further 3 hours. It is then cooled and worked up as in Example 1.

The product contains 17.7% Br and 6.1% Cl.

It will be understood that many variations and modifications are possible in my procedure, without departing from the spirit of this invention.

In the claims below it should be understood that by the terms "a pyranthrone-halogen addition compound", "a pyranthrone-sulfuryl chloride addition compound", "a pyranthrone-bromine addition compound", I am referring to such addition compounds which may be formed from pyranthrone and the respective halogenating agent, and which are characterized by the following properties: they appear as black powders in nitrobenzene suspension; show dark-violet needles of green fluorescence when viewed under the microscope; decompose upon heating or when exposed to air or moisture to give non-halogenated pyranthrone; and when reacted upon with strong halogenating or anhydrous oxidizing agents, such as chlorine, they are converted into halogenated pyranthrones of orange to red color when in powder form. By the term "anhydrous organic liquid", I am referring to such liquids as are generally employed in the halogenation of pyranthrone, as typified by nitrobenzene, dichlorobenzene, trichlorobenzene and tetrachlorethane. These liquids are characterized by neutral reaction and by substantial inertness toward halogenation.

I claim:

1. A halogen-pyranthrone body characterized by being when dry an orange to scarlet powder, and by yielding upon reaction with alpha-amino-anthraquinone a vat dyestuff dyeing cotton in khaki to olive-green shades.

2. A halogen-pyranthrone body containing not over three atoms of halogen per molecule, said body being when dry an orange to red powder, and yielding upon reaction with alpha-amino-anthraquinone a vat dyestuff dyeing cotton in green shades.

3. A trichloro-pyranthrone body characterized by being when dry an orange-brown powder, and yielding upon reaction with alpha-amino-anthraquinone a vat dyestuff dyeing cotton in olive-green shades.

4. A bromo-pyranthrone body containing not over two atoms of bromine per molecule, said body being when dry a bright-red powder, and yielding upon reaction with alpha-amino-anthraquinone a vat dyestuff dyeing cotton in olive-green shades.

5. A monobromo-pyranthrone body characterized by being when dry an orange-brown powder, and yielding upon reaction with alpha-amino-anthraquinone a vat dyestuff dyeing cotton in khaki shades.

6. A halogen-pyranthrone body containing both bromine and chlorine characterized by being when dry a scarlet powder, and yielding upon reaction with alpha-amino-anthraquinone a vat dyestuff dyeing cotton in olive-green shades.

7. A halogen-pyranthrone body, being substantially identical with the product obtainable by reacting with a halogenating agent upon pyranthrone in nitrobenzene under mildly reducing conditions whereby to form mainly an intermediate addition-product, and then decomposing said intermediate with a different halogenating agent.

8. A halogen-pyranthrone body, being substantially identical with the product obtainable be reacting with bromine upon pyranthrone in nitrobenzene under mildly reducing conditions whereby to form mainly an intermediate addition-product, and then decomposing said intermediate with an anhydrous chlorinating agent.

9. A halogen-pyranthrone body, being substantially identical with the product obtainable by reacting with sulfuryl chloride upon pyranthrone in nitrobenzene under mildly reducing conditions whereby to form mainly an intermediate addition-product, and then decomposing said intermediate by the aid of chlorine.

10. A halogen-pyranthrone compound containing not over 3 atoms of halogen per molecule, said compound being isomeric with known halogen-pyranthrones obtained by direct halogenation of pyranthrone, and being substantially identical with the product obtained by decomposing a pyranthrone-halogen addition-compound in the presence of a halogenating agent which is capable of acting as an oxidizing agent.

11. A trichloro-pyranthrone compound being isomeric with known trichloro-pyranthrones obtained by direct chlorination of pyranthrone, and being substantially identical with the product obtained by decomposing a pyranthrone-sulfuryl chloride addition-compound in the presence of chlorine.

12. A dihalogen-pyranthrone compound being isomeric with known dihalogen pyranthrones obtained by direct halogenation of pyranthrone, and being substantially identical with the product obtained by decomposing a pyranthrone-halogen addition-compound in the presence of a halogenating agent which is capable of acting as an oxidizing agent.

13. A dibromo-pyranthrone compound being isomeric with known dibromo-pyranthrones obtained by direct bromination of pyranthrone, and being substantially identical with the product obtained by decomposing a pyranthrone-bromine addition-compound in the presence of a halogenating agent which is capable of acting as an oxidizing agent.

14. A pyranthrone-halogen addition product, being substantially identical with the compound obtainable by reacting with a halogenating agent upon pyranthrone in nitrobenzene and in the presence of aniline.

15. A pyranthrone-sulfuryl chloride addition product, being substantially identical with the compound obtainable by reacting with sulfuryl chloride upon pyranthrone in nitrobenzene and in the presence of aniline.

16. A pyranthrone-bromine addition product, being substantially identical with the compound obtainable by reacting with bromine upon pyranthrone in nitrobenzene and in the presence of aniline.

17. A halogen-pyranthrone reaction product, said product consisting of microscopical, dark violet needles having a green fluorescence, and being unstable in contact with moisture or heat, said product decomposing in the presence of water into pyranthrone and halogen.

18. A bromine-pyranthrone reaction product, said product consisting of microscopical, dark violet needles having a green fluorescence, and being unstable in contact with moisture or heat, said product decomposing in the presence of water into pyranthrone and bromine.

19. The process of producing a halogen-pyranthrone body which comprises converting pyranthrone into a pyranthrone-halogen addition product, and decomposing said addition product by the aid of an anhydrous halogenating agent having strong oxidizing abilities.

20. A process as in claim 19, the halogenating agent employed in the first step of said claim being sulfuryl chloride, and the halogenating agent mentioned in the second part of the claim being a halogen selected from the group consisting of chlorine and bromine.

21. The process of producing a halogen-pyranthrone body which comprises converting pyranthrone into a pyranthrone-bromine addition product, and decomposing said addition product by the aid of an anhydrous chlorinating agent.

22. The process of producing a halogen-pyranthrone body which comprises converting pyranthrone into a pyranthrone-bromine addition product, and decomposing said addition product by the aid of an anhydrous chlorinating agent, selected from the group consisting of thionyl chloride, sulfuryl chloride, and chlorine.

23. The process of producing a dihalogen-pyranthrone body which comprises converting pyranthrone into a pyranthrone-bromine addition product, and decomposing said addition product by the aid of an anhydrous chlorinating agent selected from the group consisting of sulfuryl chloride and chlorine.

24. The process of producing a monobromo-pyranthrone which comprises converting pyranthrone into a pyranthrone-bromine addition-compound, and decomposing said addition-compound by the aid of thionyl chloride.

25. The process of producing a halogenated pyranthrone body which comprises reacting with a halogenating agent upon pyranthrone in an anhydrous organic liquid medium and in the presence of an organic compound which is readily susceptible to bromination, and further subjecting the reaction mass to the action of a different halogenating agent.

26. A process as in claim 25, the first halogenating agent being selected from the group consisting of bromine and hydrobromic acid, and the second halogenating agent being selected from the group consisting of chlorine, sulfuryl chloride and thionyl chloride.

27. A process as in claim 25, the first halogenating agent being sulfuryl chloride, and the second halogenating agent being a member of the group consisting of bromine and chlorine.

28. The process of producing a brominated pyranthrone body which comprises reacting with bromine upon pyranthrone in an anhydrous organic liquid medium and in the presence of an organic compound which is readily susceptible to bromination, and further subjecting the reaction mass to the action of a different halogenating agent.

29. A process as in claim 28, said second reaction being concurrent with the first reaction.

30. A process as in claim 28, said second reaction being subsequent to the first reaction.

31. A process as in claim 28, the second halogenating agent being a member of the group consisting of sulfuryl chloride and chlorine.

32. A process as in claim 28, the second halogenating agent being thionyl chloride.

33. The process of producing a halogenated pyranthrone body which comprises reacting successively upon pyranthrone in an anhydrous organic liquid medium with two different halogenating agents and in the presence of a substance effective as a reducing agent in the reaction mass.

34. The process of producing a halogenated pyranthrone body which comprises reacting successively with a chlorinating agent and with a brominating agent upon pyranthrone suspended in an anhydrous organic liquid in the presence of a substance effective as a reducing agent in the reaction mass.

35. The process of producing a halogenated pyranthrone body which comprises reacting in succession with two different halogenating agents upon pyranthrone suspended in an anhydrous organic liquid, in the presence of an aromatic amine which is readily susceptible to halogenation, or a salt of such amine.

36. The process of producing a halogenated pyranthrone body which comprises reacting in succession with a brominating agent and with a chlorinating agent upon pyranthrone suspended in an anhydrous organic liquid, in the presence of an aromatic amine, which is readily susceptible to halogenation or a salt of such amine.

37. The process of producing a halogenated pyranthrone body which comprises reacting in succession with bromine and sulfuryl chloride upon pyranthrone suspended in an anhydrous organic liquid, in the presence of a compound selected from the group consisting of sulfur dioxide, aromatic amines, hydrocarbons, phenols, cyclic alcohols, aliphatic ketones and salts of any of these.

38. The process of producing a halogenated pyranthrone body which comprises reacting in succession with bromine and thionyl chloride upon pyranthrone suspended in an anhydrous organic liquid, in the presence of a compound selected from the group consisting of sulfur dioxide, aromatic amines, hydrocarbons, phenols, cyclic alcohols, aliphatic ketones, and salts of any of these.

39. The process of producing a chlorinated pyranthrone body which comprises reacting in succession with sulfuryl chloride and chlorine upon pyranthrone suspended in an anhydrous organic liquid, in the presence of a compound selected from the group consisting of sulfur dioxide, aromatic amines, hydrocarbons, phenols, cyclic alcohols, aliphatic ketones and salts of any of these.

40. The process of producing a pyranthrone-halogen addition-compound which comprises reacting with a halogenating agent upon pyranthrone in the presence of aniline or a salt thereof.

41. The process of producing a pyranthrone-bromine addition-compound, which comprises reacting with bromine upon pyranthrone in the presence of aniline or a salt thereof.

42. The process of producing a pyranthrone-halogen addition-compound, which comprises reacting with a halogenating agent upon pyranthrone in a medium of nitrobenzene and in the presence of an aniline body.

43. The process of producing a pyranthrone-sulfuryl chloride addition-compound, which comprises reacting with sulfuryl chloride upon pyranthrone in a medium of nitrobenzene and in the presence of an aniline body.

44. The process of producing a pyranthrone-bromine addition-compound, which comprises reacting with bromine upon pyranthrone in a medium of nitrobenzene and in the presence of an aniline body.

45. The process of producing a pyranthrone-bromine addition-compound, which comprises reacting with bromine upon pyranthrone in a medium of nitrobenzene and in the presence of aniline hydrochloride.

46. The process of producing a pyranthrone-bromine addition-compound, which comprises reacting with bromine upon pyranthrone in a medium of nitrobenzene and in the presence of iodine and aniline hydrochloride.

47. In the process of halogenating pyranthrone, the step which comprises introducing into the reaction mixture initially a neutral substance capable of developing a mild reducing agent in the reaction mass.

48. In the process of brominating pyranthrone, the step which comprises introducing into the reaction mixture initially a neutral substance capable of developing hydrobromic acid in nascent state to initiate and direct the bromination.

49. In the process of halogenating pyranthrone by reacting upon pyranthrone suspended in a liquid medium with a halogenating agent, the step which comprises forming in the reaction mixture an initial quantity of a mild reducing agent in statu-nascendi, whereby to initiate, catalyze or direct the halogenation toward the production of an intermediate pyranthrone-halogen addition-compound.

50. In the process of brominating pyranthrone by reacting with bromine upon pyranthrone suspended in a liquid medium, the step which comprises forming in the reaction mixture an initial quantity of hydrobromic acid in statu-nascendi, whereby to initiate, catalyze or direct the bromination toward the production of an intermediate pyranthrone-bromine addition-product.

JOSEPH DEINET.